(No Model.)
I. A. F. BANG & M. C. A. RUFFIN.
APPARATUS FOR PURIFYING CRUDE SPIRIT AND REGENERATING THE PURIFYING AGENT.
No. 370,674. Patented Sept. 27, 1887.
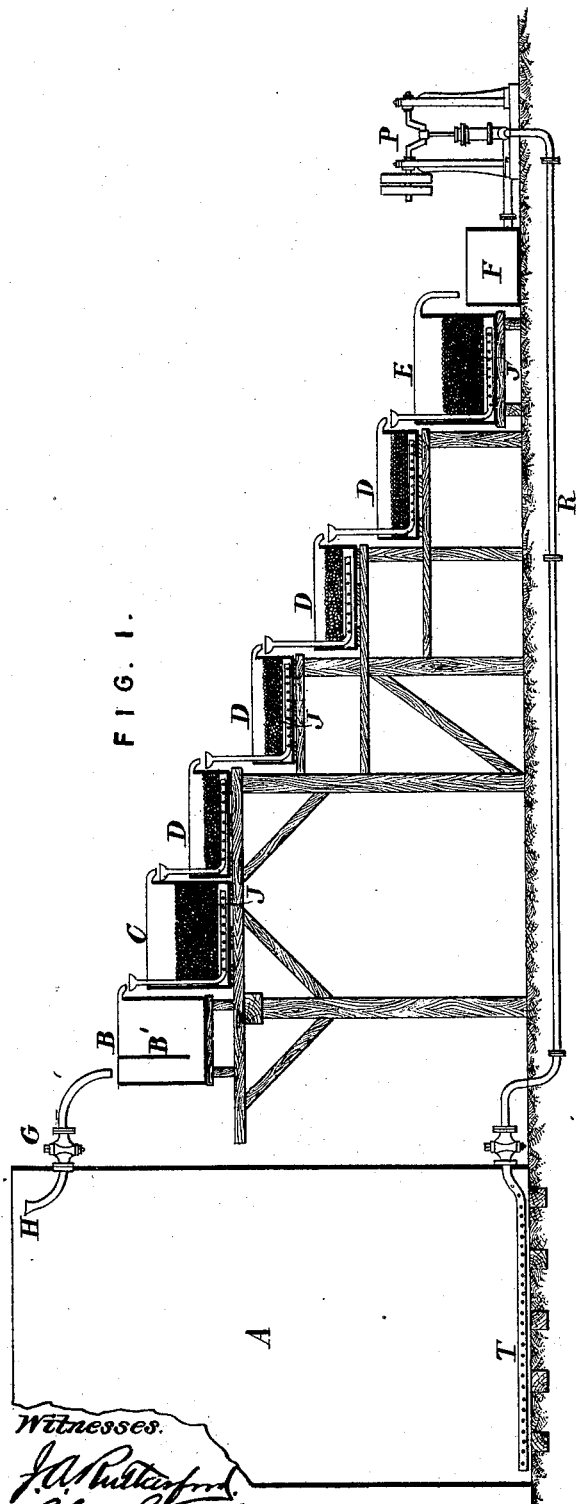
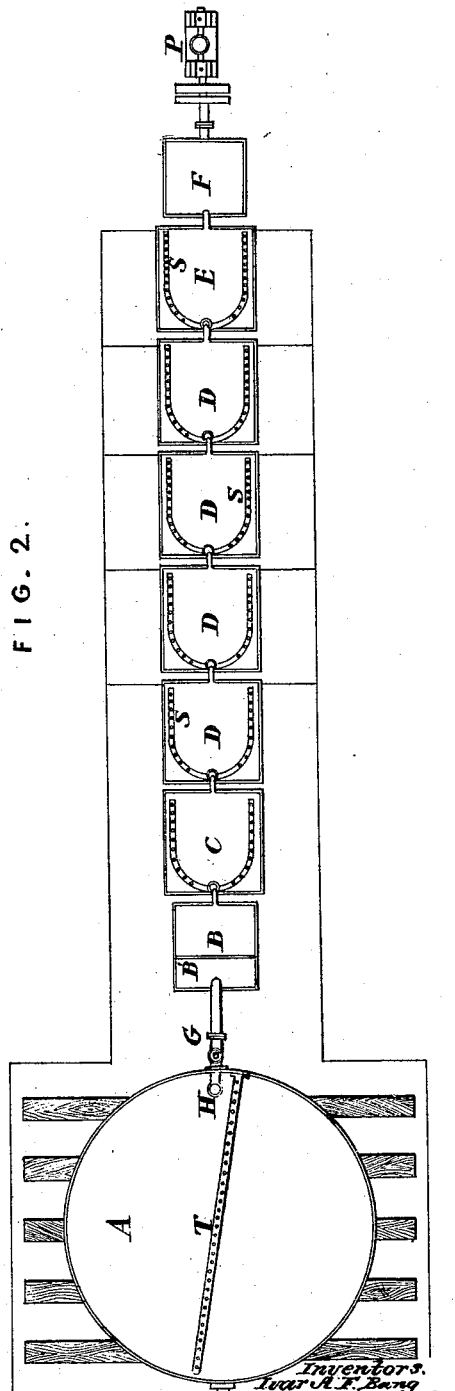

UNITED STATES PATENT OFFICE.

IVAR A. F. BANG AND MARIE C. A. RUFFIN, OF PARIS, FRANCE.

APPARATUS FOR PURIFYING CRUDE SPIRIT AND REGENERATING THE PURIFYING AGENT.

SPECIFICATION forming part of Letters Patent No. 370,674, dated September 27, 1887.

Application filed April 18, 1887. Serial No. 235,244. (No model.)

*To all whom it may concern:*

Be it known that we, IVAR AXEL FERDINAND BANG, a citizen of Denmark, and MARIE CHARLES ALFRED RUFFIN, a citizen of France, residing, respectively, at Rue de la Passy, Paris, and at Avenue d'Antin, Paris, both in the Republic of France, have invented a new and useful Apparatus for Purifying Crude Spirit and Regenerating the Purifying Agent, of which the following is a specification.

It has been proposed to purify crude spirit by the application of hydrocarbons capable of dissolving and eliminating impurities, such as fusel and other essential oils.

This invention relates to apparatus for conducting an improved process for this purpose, (which is the subject-matter of a patent application of even date herewith,) as will be described, referring to the accompanying drawings.

Figure 1 represents a longitudinal section, and Fig. 2 a plan, showing an arrangement of apparatus for conducting the purifying process in the following manner.

The spirit to be treated is first rendered alkaline by the addition of soda or potash; or it might be lime or other alkaline earth. Soda is preferred on account of its cheapness and solubility. When lime or other alkaline earth is used, the mixture has to be continuously agitated; but when soda or potash is employed only occasional agitation is necessary. In applying the alkali it is to be mixed with the spirit in repeated small doses for from twenty to thirty hours until at last the spirit is found by testing to be decidedly alkaline. It is then ready for purification, and for this purpose the alkaline spirit is run into a vessel, A, up to a level a little under that of the overflow-pipe H. A petroleum-oil as pure as possible, without taste or smell, and of such character that it does not boil under 100° centigrade, is now pumped into the vessel A through a perforated pipe, T. The oil, rising in numerous small streams through the spirit, collects at the top and overflows by the pipe H through the open stop-cock G into the filter B, which has a partition, B'. The oil, descending on one side of the partition and ascending on the other, deposits in B some of the heavier impurities carried over by it. From B the oil overflows to the next vessel, C, which it enters at the bottom from a perforated pipe and through a perforated floor, J. On this floor are laid a number of clean fragments of flint, glass, or other such like material, and the vessel is charged with water. The oil, rising in fine streams subdivided by the solid fragments through the water, gives up to it such small quantity of spirit as may have been carried over by it from A. From the water-vessel C the oil passes through a succession of vessels, D, each of which is charged with sulphuric acid and with fragments of flint, glass, or substances of a like kind, such as are not attacked by the acid. Practically it is found that four of the sulphuric-acid vessels D suffice for the complete regeneration of the hydrocarbon, the acid taking up the essential oils which the hydrocarbon had eliminated from the spirit. From the last of the vessels D the hydrocarbon passes to a vessel, E, containing a solution of soda, which neutralizes such acid as the hydrocarbon may contain. Finally, from E the regenerated hydrocarbon passes to a reservoir, F, from which it is drawn by a pump, P, and sent by a pipe, R, back to A to pass again through the spirit. This treatment continued for from twenty to thirty hours effects purification of the charge of spirit contained in A. During the operation, at intervals of two or three hours, a portion of the impure sulphuric acid is withdrawn from the uppermost of the vessels D, and a corresponding quantity is transferred from each of the vessels D to the next above it, a corresponding supply of fresh acid being introduced into the lowest of the vessels D.

The vessels D, which contain sulphuric acid, are preferably made of wood lined with lead, and provided with leaden pipes and their perforated branches S.

The perforated floors J, not being exposed to oxidation, may be of copper.

In the process above described the preliminary alkalizing of the spirit, though not absolutely necessary, is important, as promoting the elimination of such aldehyde as the spirit may contain.

By the use of petroleum-oil of a comparatively heavy character, that does not flash under 140° centigrade, risk of fire is avoided, and, owing to the oil not being volatile, all the vessels employed may be open, as shown in the drawings.

We make no general claim to the purification of crude spirit by hydrocarbons, nor to the regeneration of the hydrocarbons by sulphuric acid, operations of this kind having been previously proposed and applied more or less experimentally; neither do we here claim our process for purifying crude spirit and regenerating the purifying agent, as such claim is embraced in a separate application, Serial No. 235,245, of even date herewith; but,

Having thus described the nature of our invention and the best means we know of carrying the same into practical effect, we claim—

An apparatus for purifying crude spirit and regenerating the purifying agent, consisting of the alkaline-spirit tank A, having the perforated pipe T at its bottom for introducing pure petroleum-oil, and the overflow-pipe H and open stop-cock G at its top, the open filter B, having the partition B', on one side of which the stop-cock delivers the oil, the open water-vessel C, containing a perforated floor, fragments of glass, and a perforated pipe under the floor receiving the oil from the top of the filter, the series of open acid-holding vessels D, containing perforated floors, fragments of glass, and perforated pipes under the floors, respectively, receiving the oil from the tops of the vessels, an open alkali-holding vessel, E, containing a perforated floor, and a perforated pipe under the floor, a receiving-tank, F, and a pump, P, connected with the latter, and the perforated pipe for returning the regenerated oil to the spirit-tank, said vessels being arranged in successive steps in the order named, substantially as shown and described.

In testimony whereof we have signed our names to this specification, in the presence of two subscribing witnesses, this 2d day of April, A. D. 1887.

I. A. F. BANG.
M. C. A. RUFFFIN.

Witnesses:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*